United States Patent Office 3,457,247
Patented July 22, 1969

3,457,247
FLUOROCARBON COMPOUNDS AND POLYMERS THEREOF
Atsuo Katsushima, Fuse-shi, Iwao Hisamoto, Suita-shi, and Shoshin Fukui, Takahisa Kato, and Masayuki Nagai, Mishima-gun, Osaka-fu, Japan, assignors to Daikin Kogyo Kabushiki Kaisha, Kitaku, Osaka-shi, Japan, a juridical person of Japan
No Drawing. Filed Feb. 8, 1966, Ser. No. 525,848
Claims priority, application Japan, Feb. 12, 1965, 40/7,926, 40/7,928, 40/7,929; Mar. 24, 1965, 40/17,328
Int. Cl. C08f *3/66;* D06m *15/36*
U.S. Cl. 260—89.5                     5 Claims

ABSTRACT OF THE DISCLOSURE

New compounds having the general formula:

$$H-\underset{R_f^2}{\overset{R_f^1}{\underset{|}{C}}}-\underset{R_f^4}{\overset{R_f^3}{\underset{|}{C}}}-\underset{R_2}{\overset{R^1}{\underset{|}{C}}}-OOC(CH_2)_n\overset{R_3}{\underset{}{C}}=CH_2$$

wherein $R_f^1$, $R_f^2$, $R_f^3$, and $R_f^4$ are respectively one member of the group consisting of —F, —CF$_3$, —CF$_2$CF$_3$,

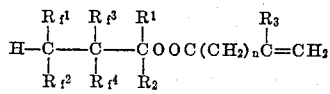

and

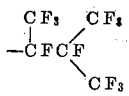

with the proviso that $R_f^1$ and $R_f^2$ are not both —F and $R_f^3$ and $R_f^4$ are not both —F; $R^1$, $R^2$ and $R^3$ are respectively one member of the group consisting of —H and —CH$_3$; and $n$ is an integer of from 0 to 10.

---

This invention relates to a new and useful class of fluorocarbon compounds and their polymers; and to aqueous emulsions or organic solvent solutions thereof suitable for treating solid materials, such as, fibrous or porous materials to render them water- and oil-repellent.

The new compounds are esters having the general formula:

$$H-\underset{R_f^2}{\overset{R_f^1}{\underset{|}{C}}}-\underset{R_f^4}{\overset{R_f^3}{\underset{|}{C}}}-\underset{R^2}{\overset{R^1}{\underset{|}{C}}}-OOC(CH_2)_n\overset{R_3}{\underset{}{C}}=CH_2 \quad (1)$$

wherein $R_f^1$, $R_f^2$, $R_f^3$ and $R_f^4$ represent respectitvely —F, —CF$_3$,

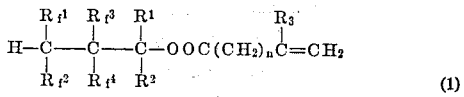

except the case of both $R_f^1$ and $R_f^2$ or both $R_f^3$ and $R_f^4$ being —F; $R^1$, $R^2$ and $R^3$ represent respectively —H or —CH$_3$; and $n$ is an integer of from 0 to 10.

The esters of this invention can be readily polymerized to produce solid polymers which are of hydrophobic and oleophobic property and available as water- and oil-repellent agents.

Said esters of the invention can be prepared by esterifying ω-hydropolyfluoroalkanols having the formula

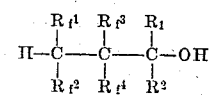

(Formula 2), which is prepared from addition reaction of perfluoroolefins having the formula

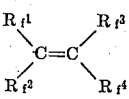

(Formula 3) and aliphatic alcohols having the formula of

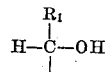

(Formula 4), with unsaturated aliphatic acids or derivatives thereof having the formula CH$_2$=CR$^3$(CH$_2$)$_n$COY (Formula 5), as shown in the following equations:

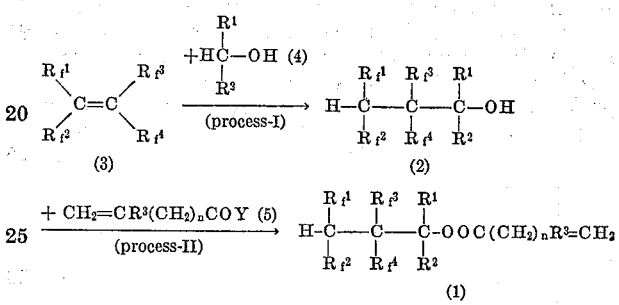

(1)

wherein $R_f^1$, $R_f^2$, $R_f^3$, $R_f^4$, $R^1$, $R^2$, $R^3$ and $n$ are as defined before; and Y is a holgene, —OH or —OR$^4$, R$^4$ being a lower alkyl of 1 to 5 carbon atoms.

The representative examples of the starting perfluoroolefin of Formula 3 are hexafluoropropylene dimers and trimers which are prepared by origomerization of hexafluoropropylene, and which are shown as follows:

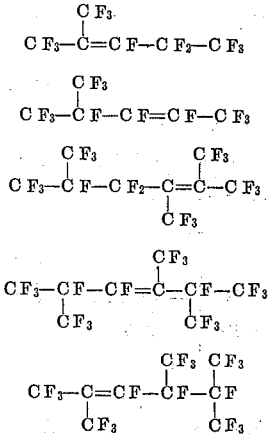

The aliphatic alcohols of Formula 4 employed in the process-I of said equations include methanol, ethanol and isopropanol, most desirable being methanol. The process-I comprising the addition reaction of said perfluoroolefins and aliphatic alcohols may be usually carried out in a closed vessel such as glass ampoule, stainless-steel autoclave, etc., in the presence of free-radical catalysts such as benzoyl peroxide, tertiarybutylhydro peroxide, ditertiarybutyl peroxide, tertiarybutyl perbenzoate, diisopropyl peroxydicarbonate, azobisisobutyronitrile, etc. The suitable reaction temperature is selected from a wide range according to the kinds of the catalysts employed, but a temperature of 40 to 1500 C. is usually preferred. The reaction pressure may be about 0 to 10 kg./cm.$^2$ g., although an autogenous pressure is used and preferred in many cases. The reaction is accelerated or facilitated by applicating vigorous agitation and/or by adding to the reaction system organic liquids such as trichlorotrifluoroethane which are solvents for both starting reactants and inert to the reactants and the products. The amount of the starting alcohol, based on the amount of perfluoroolefin employed, may be selected from a wide range, but in general it is desirable that a slight excess of the alcohol is employed. The starting perfluoroolefins may be employed either singly or in admixture, and the latter case sometimes accelerates the addition reaction. For instance, when hexafluoropropylene dimer and trimer are employed in admixture with each other, the addition of aliphatic alcohol to the trimer is accelerated. It is accordingly no need to separate dimer and trimer respectively from hexafluoropropylene origomer.

The second process-II comprises the esterification of the adducts, ω-hydropolyfluoroalkanols of Formula 2, resulting from the aforesaid first process-I with unsaturated aliphatic acids or their derivatives of Formula 5. Of the compounds of Formula 5, particularly those in which $n$ represents zero, e.g. acrylic acid or methacrylic acid or an acid chloride thereof is preferably employed. The esterification may be usually carried out at an elevated temperature, preferably at about 50° to 150° C. The reaction pressure is not critical, but an autogenous pressure is usually preferred. The amounts of the reactants to be employed may be selected from a wide range, although the starting compound of lower boiling point is desirably employed in a theoretical or slightly excess amount. A dehydrogenating agent, such as, concentrated sulfuric acid, dried hydrogenchloride gas, etc., may be added to the reaction system if acid is employed as an esterifying agent, and a hydrogenhalide acceptor, such as, zinc chloride, concentrated sulfuric acid, pyridine, quinoline, etc., may be added if acid halide is employed. One or more species of polymerization inhibitors, such as, copper powders, hydroquinone, amines, etc., may be also added to the reaction system so as to prevent the polymerization of the starting unsaturated compounds and the resultant compounds.

The desired esters of this invention can be separated from the resultant reaction mixtures by the conventional methods such as rectification of said mixture containing polymerization inhibitors which have been added before or after the reaction, as required.

The typical examples of the present esters are as follows:

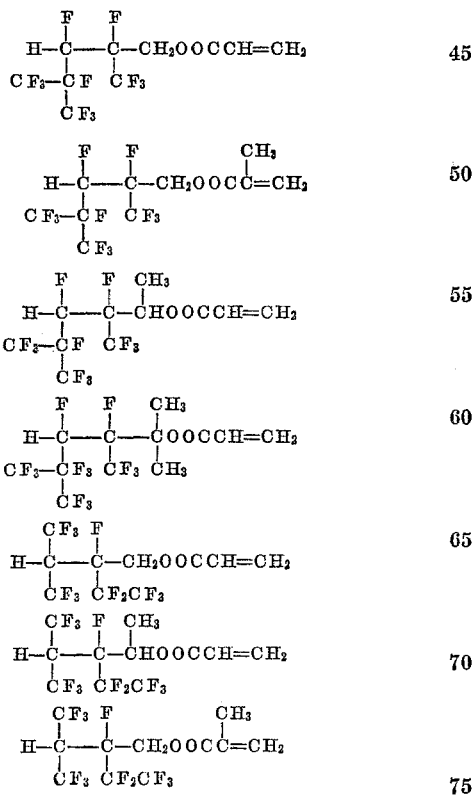

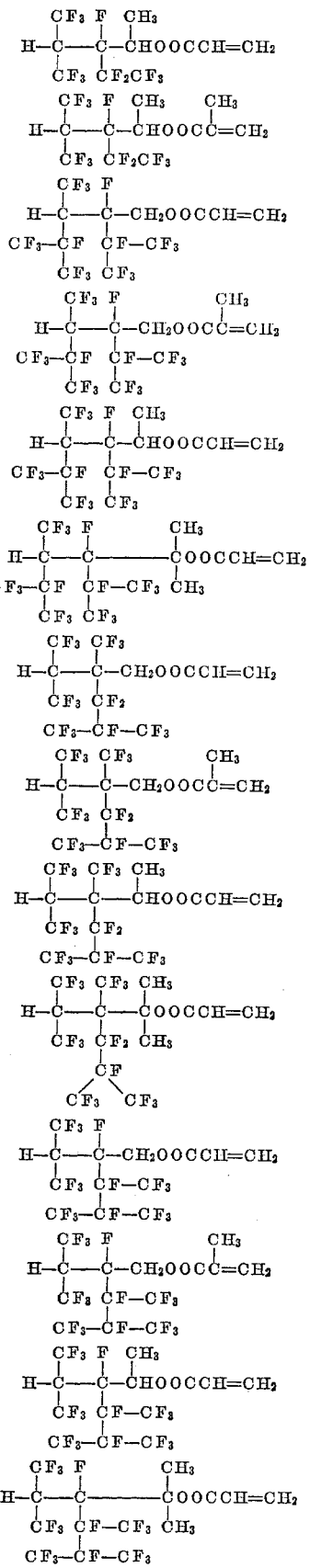

The esters of this invention are readily polymerized by the methods known to the art, for example, by bulk polymerization, solution polymerization, emulsion polymerization and suspension polymerization, using either heat, free-radical catalysts, ultraviolet rays or ionizing radiations. Said esters are polymerized either singly or in admixture with each other or with copolymerizable monomers of other kinds which contain an ethylenic linkage in the molecules, to produce novel homopolymers or copolymers of this invention.

Said copolymerizable monomers include (1) acrylic acid, methacrylic acid or such esters thereof as methyl, ethyl, butyl, isobutyl, propyl, 2-ethylhexyl, hexyl, decyl, lauryl, stearyl, etc.; (2) vinyl esters of aliphatic acids such as vinyl acetate, vinyl propionate, vinyl caprylate, vinyl laurate, vinyl stearate, etc.; (3) styrene or styrene derivatives such as α-methylstyrene, p-methylstyrene, etc.; (4) halogenated vinyl or halogenated vinylidene compounds such as vinyl fluoride, vinyl chloride, vinyl bromide, vinylidene fluoride, vinylidene chloride, etc.; (5) allyl esters of aliphatic acids such as allyl heptanoate, allyl caproate, allyl caprylate, etc.; (6) alkylvinyl ketones such as methylvinyl ketone, ethylvinyl ketone, etc.; (7) acrylamides such as N-methyl acrylamide, N-methylol acrylamide, glycidyl acrylate, glycidyl methacrylate, etc.; (8) diene compounds such as butadiene, 2,3-dichloro-1,3-butadiene, isoprene, etc.; and (9) fluorinated unsaturated esters such as $$R_f(CH_2)_qOOCCR=CH_2$$

$$R_fCH=CH(CH_2)_qOOCCR=CH_2$$

(wherein $R_f$ is perfluoroalkyl of 3 to 21 carbon atoms, R is hydrogen or methyl, and $q$ is an integer of from 1 to 10), etc. The copolymer comprising 99 to 25 weight percent of the present monomer and 1 to 75 weight percent of the comonomer containing no fluorine in the molecule, (1) to (8) above, exhibits sufficient water- and oil-repellency, although the copolymer containing less than 25 weight percent of the present monomers exhibits poor or no water- and oil-repellency.

Of polymerization methods as stated before, the most desirable one is an emulsion polymerization for which a conventional technique used in the emulsion polymerization of vinyl compounds is applicable. For instance, one or more species of the present monomers to be polymerized are dispersed in an aqueous medium having dissolved therein dispersants and free-radical catalysts, if necessary, and polymerized. The dispersants employed include those compounds being anionic, cationic or non-ionic surfactant. The desirable anionic surfactant is a sodium salt of sulfated alkenyl ($C_{16}$ to $C_{18}$) acetate, sodium oleate, sodium salt of sulfated methyloleate, an ammonium ω-hydropolyfluoroalkanoate ($C_7$ to $C_{13}$), an ammonium perfluoroalkanoate ($C_5$ to $C_{13}$), a sodium alkyl ($C_{10}$ to $C_{18}$) sulfate, a sodium alkyl ($C_{12}$ to $C_{18}$) naphthalene, a sodium alkyl ($C_{12}$ to $C_{18}$) naphthalene sulfonate, etc. The desirable cationic surfactant is (dodecylmethylbenzyl)-trimethylammonium chloride, benzyldodecyl-dimethylammonium chloride, N-(2-(diethylamino)-ethyl)-oleamide hydrochloride, dodecyltrimethyl ammonium acetate, trimethyltetradecylammonium chloride, etc. The desirable non-ionic surfactant is a condensation product of polyoxyethylene glycol and hexyl phenol, isooctyl phenol, hexadecanol, oleic acid, alkane ($C_{12}$ to $C_{16}$) thiol, alkyl ($C_{12}$ to $C_{18}$) amine.

The free-radical catalysts employed include those compounds known to the art for the polymerization of conventional vinyl compounds, for example, benzoyl peroxide, lauroyl peroxide, tertiarybutyl perbenzoate, 1-hydroxycyclohexylhydro peroxide, 3-carboxypropionyl peroxide, acetyl peroxide, azobisisobutyramidine dihydrochloride, azobisisobutyronitrile, sodium peroxide, barium peroxide, hydrogen peroxide, potassium persulfate, ammonium persulfate, etc.

The polymerization temperature varies over a wide range according to the polymerization method and the kinds of monomers, dispersants and catalysts employed, but in emulsion polymerization a temperature of from 0° to 80° C. is usually employed, although 20° to 70° C. is preferred. The pressure, 0 to 10 kg./cm.² g. is usually applied in emulsion polymerization, most desirable being 0 to 5 kg./cm.² g.

The polymers of this invention, including both homopolymers and copolymers are characterized by the presence of the skeletal chain of recurring or repetitive ω-hydropolyfluoroalkyl ester units which can be represented as follows:

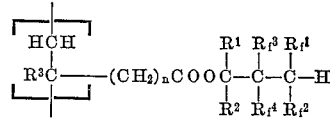

wherein $R_f^1$, $R_f^2$, $R_f^3$, $R_f^4$, $R^1$, $R^2$, $R^3$ and $n$ are as defined before. The homopolymers contain these recurring units attached to one another by the valence bonds shown in the above formula, and the copolymers contain these groups interspersed with groups derived from copolymerizable monomers employed.

These polymers of this invention have a markedly excellent water-repellent and oil-repellent property due to a multiplicity of ω-hydroperfluoro alkyl group

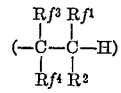

and have a good affinity for fibrous or other porous materials to be treated therewith.

In general it has been considered that a fluorocarbon polymer having hydrogen atom at ω-position of the fluoroalkyl group cannot impart sufficient oil-repellency to the materials treated therewith. For instance, the cotton fabrics treated with a polymer of

which is known as water- and oil-repellent are wetted by the drops of a 6:4 volume ratio mixture of "Nujol" (white mineral oil) and n-heptane, although they repel a 7:3 volume ratio mixture of "Nujol" and n-heptane.

On the other hand polymers of this invention always display excellent oil-repellent effects for example, the cotton fabrics treated with the polymer of the present ester having only 6 carbon atoms bonded to fluorine can repel even a 4:6 volume ratio mixture of "Nujol" and n-heptane.

It is easily understood by one skilled in the art that these specific characteristics of the present polymers make them especially suitable for the use of water- and/or oil-repellent.

Water- and oil-repellent compositions containing the present polymers are of various forms, such as aqueous emulsions, organic solvent solutions or self-pressurized sprayable products, "aerosols." As aqueous emulsion prepared by emulsion polymerization may be advantageously used as it is, or may be diluted or concentrated. There may be added stabilizers, pH adjusters and/or other water- or oil-repellent compounds known to the art, where necessary. The aqueous emulsion can be also prepared by dispersing the polymer powder in an aqueous medium. An organic solvent solution is prepared by dissolving the polymer at an atmospheric or elevated temperature in one or more of such organic solvents as acetone and/or trichlorotrifluoroethane etc. In preparation of aerosols, a propellant such as dichlorodifluoromethane, monofluorotrichloromethane, dichlorotetrafluoroethane, etc., is added to such a solution.

The water- and oil-repellent compositions of this invention may be applied to the solid materials by painting, dipping or spraying at room temperatures, or at elevated temperatures conventional in the art. The materials to be treated include fibrous or other porous or non-porous materials such as woven fabrics, knit fabrics, papers, fibreboards, felts, etc., made of natural fibres such as cellulose, cotton, wool, etc., fully synthetic fibres such as polyamides, polyesters, polyacrylonitrls, etc. and/or partially synthetic fibres such as cellulose acetate, cellulose propionate, etc.; leathers; and goods made of glass, woods, etc.

The coated materials thus obtained are dried at room temperatures or at elevated temperatures and further, if necessary, a curing process may be applied. During or after the curing, a soaping process may also be applied, as required. The drying may be accomplished or accelerated by the application of mild heating (usually 80° to 150° C.), a current of air or other inert gas, reduced pressure or by a combination of such means. The curing process is usually required if emulsion-type compositions are used, whereby the polymer particles coalesce each other to form a continuous polymer layer firmly attached to the coated materials. Said process is carried out by heating the materials at 80° to 200° C., preferably at 100° to 150° C., for 1 to 20 minutes. The soaping process is also required in using emulsion-type compositions, if necessary, whereby dispersants and polymerization initiators contained in emulsions are washed out. Said process is usually carried out by washing the materials with a 0.1 to 0.5 weight percent aqueous solution of a neutral detergent at 40° to 60° C. for 10 seconds to 5 minutes. There is no need, as a rule, to apply said curing and soaping processes, if solution-type or aerosol-type compositions are used.

Aforementioned treating methods are illustrative only and we do not intend to limit this invention to the same, as there are various other modifications which are readily apparent to those skilled in the art.

The thus treated materials, which are coated with the polymers of this invention, display a markedly excellent water- and oil-repellent property due to the ω-hydroperfluoroalkyl side chain

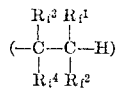

exposed on the outer surface of the treated materials. For instance, drops of water or oil deposited on the surface will remain or run off rather than spreading and wetting the surface. This excellent water- and oil-repellent property is secured when the polymer of this invention is attached to the materials in the range of only from 0.1 to 5 weight percent based on the weight of the materials, although said water- and oil-repellent property will increase if a greater amount of polymer is attached.

The water- and oil-repellent compositions of the invention may be also employed with other known water-repellent and/or oil-repellent agents, whereby the treated materials increase in water- and/or oil-repellent effects and in particularly durability for washing and dry-cleaning in many cases. The most desirable known agents are quaternary pyridinium salts having a higher alkyl group of 12 to 20 carbon atoms. For instance there are exemplified compounds having the formula of

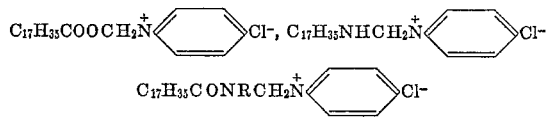

etc. which are known to the art as a water-repellent agent and available under the trade name "Norane R" (trademark of Warwick Chemical Co., U.S.A.), "Zelan AP" (trademark of E. I. du Pont de Nemours & Co., U.S.A.) and "Velan PF" (trademark of Imperial Chemical Industries Ltd., U.K.).

The treatment with the known water- and/or oil-repellent agents is preferably applicable before or after the treatment with the present compositions by two-step treatment, although it is also applicable during the treatment with the present compositions by one-step treatment.

EXAMPLE 1

A 100-cc. glass ampule was charged with 32 grams of methanol, 1 gram of benzoyl peroxide and 75 grams of a mixture of 2 species of hexafluoropropylene dimers, i.e.,

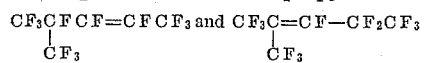

obtained by heating hexafluoropropylene in the presence of potassium bromide in dimethyl formamide at 100° C. for 1 hour. Then the mixture was cooled and solidified with liquid air, and the air in the ampule was evacuated by a vacuum pump and nitrogen gas was substituted, and then the nitrogen gas was again evacuated by the vacuum pump and the ampule was sealed under a reduced pressure. The reaction system was heated with violent shaking at 100° C. for 10 hours, and on completion of the reaction a homogeneous solution was obtained. The resultant solution was rectified to obtain 59 grams of a distillate boiling at 135–142° C. By preparative gas chromatograph the distillate was divided into 2 components. Said 2 components were confirmed by infrared spectroscopic analysis and elementary analysis to be addition products of methanol to the starting hexafluoropropylene dimers, namely,

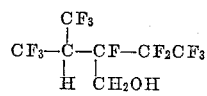

and

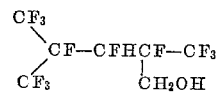

Then, 48 grams of the mixture of the fluorinated alcohols synthesized as above and 0.3 gram of hydroquinone and 0.3 gram of copper powder were placed in a 100-cc., 4-necked flask with a reflux cooler, thermometer, nitrogen gas injector and dropping funnel and the air in the flask was thoroughly replaced by nitrogen gas, and heated to 60–70° C. with violent agitation, during which 15 grams of acrylchloride was added dropwise thereto in about 30 minutes, after which the reaction was continued for about 1 hour. The resultant mixture was rectified under reduced pressure, yielding 2 grams of byproduct of a low boiling point and 15 grams of a distillate (A) boiling at 79–81° C./20–22 mm. Hg and 24 grams of a distillate (B) boiling at 86–87° C./20–22 mm. Hg. Both distillates (A) and (B) above showed absorptions, by infrared spectroscopic analysis, at 5.7μ due to >C=O, at 1.15μ due to —CH=CH$_2$ and at 7–9.5μ due to C—F.

Elementary analysis gave:
Substance (A)—C=30.9%; F=58.7%; H=1.61%.
Substance (B)—C=32.1%; F=58.0%; H=1.50%.
Calculated values for $C_{10}F_{12}H_6O_2$: C=31.1%; F=59.1%; H=1.55%.

Thus the substances (A) and (B) were confirmed respectively to be the esters of the starting fluorinated alcohols and acrylchloride, and further by nuclear magnetic resonance analysis to be:

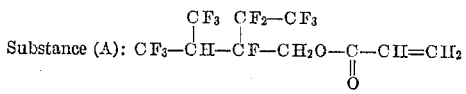

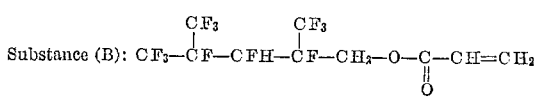

A mixture of 6 grams of the substance (A) and 9 grams of the substance (B) above, 90 grams of deoxidated water, 7 grams of acetone and 3.5 grams of

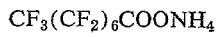

were placed in a 200-cc. 4-necked flask with a reflux cooler, thermometer, dropping funnel, nitrogen gas injector and agitator, and the air in the flask was thoroughly replaced by nitrogen gas. Then the temperature in the flask was gradually raised to 50° C. with agitation and 50 grams of a 2 weight percent aqueous solution of ammonium persulfate was added quickly to the mixture at such temperature. Agitation was further continued for 5 hours and 40 minutes at 55 to 60° C., whereby 161 grams of a stable polymer dispersion having a concentration of 8.9 weight percent was obtained.

The resultant dispersion was diluted with water to a polymer concentration of 1.0 weight percent and a cotton gauze, 30 cm. x 45 cm., was immersed into the diluted dispersion. Then the gauze was dried in the air and further dried in a drier at 130° C. for 15 minutes. The dried gauze was washed with a 0.3 weight percent aqueous solution of a neutral detergent and thoroughly washed with water.

The gauze thus treated showed no change in touch, brightness, strength, etc., and exhibited excellent water-repellency and oil-repellency repelling a 1:1 volume ratio mixture of liquid paraffin and n-heptane.

EXAMPLE 2

A 600-cc. stainless steel autoclave was charged with 270 grams of the mixture of 3 species of hexafluoropropylene trimers, i.e.,

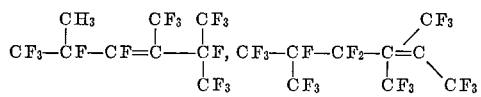

and

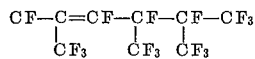

which were synthesized in the manner as Example 1, 40 grams of methanol, 300 grams of trichlorotrifluoroethane and 4 grams of ditertiarybutylperoxide and the air in the autoclave was thoroughly replaced by nitrogen gas, and the system was heated with shaking at 130° C. for 30 hours, producing a homogeneous solution. The solution was rectified whereby 106 grams of the unreacted trimers was recovered and 95 grams of a distillate (A) boiling at 75–81° C./10–11 mm. Hg, 26 grams of a distillate (B) boiling at 84–85° C./10–11 mm. Hg and 35 grams of a distillate (C) boiling at 90–91° C./10–11 mm. Hg were obtained.

These distillates (A), (B) and (C) respectively showed an broad absorption near $3.0\mu$ due to —OH, and the following values were obtained by elementary analysis:
Substance (A)—C=24.5%; F=71.2%; H=0.90%.
Substance (B)—C=24.7%; F=70.8%; H=0.85%.
Substance (C)—C=24.7%; F=70.3%; H=0.86%.

Calculated values for $C_{10}F_{18}H_4O$: C=24.90%; F=70.95%; H=0.83%.

Thus these 3 substances (A), (B) and (C) were found respectively to be 3 isomers, and further by nuclear magnetic resonance absorption analysis were found that:

Substance (A): 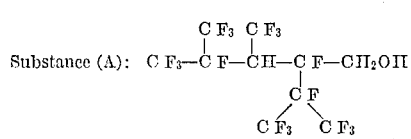

Substance (B): 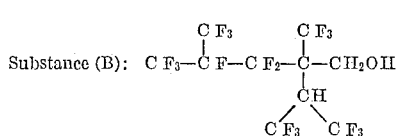

Substance (C): 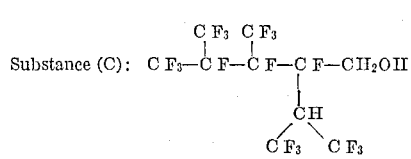

A 200-cc., 4-necked flask with a reflux cooler, thermometer, nitrogen gas injector, dropping funnel and agitator was charged with 86 grams of

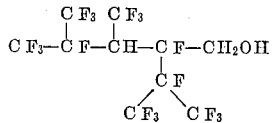

synthesized as above and 0.2 gram of hydroquinone and the mixture was heated with agitation at 70–80° C. in a nitrogen gas stream, during which 20 grams of methacryl chloride was added dropwise in about 30 minutes, after which the reaction was continued for about 1 hour. The resultant reaction mixture was distilled under reduced pressure, yielding 82.5 grams of a distillate boiling at 88°–89° C./0.92 mm. Hg. The distillate showed by infrared spectroscopic analysis absorptions at $5.75\mu$ due to >C=O, at $6.15\mu$ due to

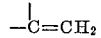

and widely at $7-9.5\mu$ due to C—F, and by elementary analysis the following values were found: C=31.5%; F=61.0%; H=1.50%.

Calculated values for $C_{10}F_{12}H_6O_2$: C=30.5%; F=62.18%; H=1.45%.

Thus the distillate was confirmed to be an ester of the starting fluorinated alcohol and methacrylchloride, i.e.,

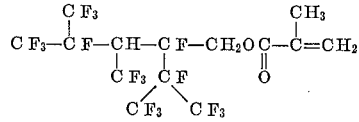

50 grams of

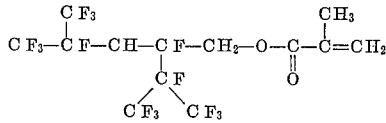

and 450 grams of trichlorotrifluoroethane were placed in a 500-cc., 4-necked flask with a reflux cooler, thermometer, dropping funnel and nitrogen gas injector and the mixture was agitated in a nitrogen gas stream, and subjected to irradiation of 400-watt ultra-violet rays at a distance of 45 cm. from the center of the flsk. During the irradiation trichlorotrifluoroethane partly vaporized away due to the radiant heat so trichlorotrifluoroethane was added dropwise through the dropping funnel as required. After 25 hours of irradiation 487 grams of a polymer solution of somewhat high viscosity, light yellow in color was obtained. The polymer concentration thereof was 9.5 weight percent.

A part of said solution was diluted with trichlorotrifluoroethane to a polymer concentration of 1.1 weight percent, in which the cuttings of tetron-cotton (65:35) cloth were dipped and lightly squeezed then dried. The cloth thus treated exhibited excellent oil-repellency, sustaining drops of n-octane, machine oil, kerosene oil and frying oil for a long time without infiltration.

EXAMPLE 3

150 grams of

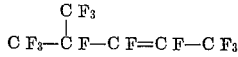

(boiling point, 46° C.), which were obtained in the manner as Example 1, and were separated from an isomer by repeated rectification, 46 grams of ethanol and 1.8 grams of benzoyl peroxide were placed in a 200-cc. stainless steel autoclave and the mixture was cooled with a Dry Ice-methanol refrigerant and the air in the autoclave was thoroughly replaced by nitrogen gas. The system was then violently shaken at 100°–108° C. for 10 hours. The resultant mixture was distilled to produce 107 grams of a distillate boiling at 84–86° C./80–81 mm. Hg with 61 grams of the unreacted dimer recovered.

The distillate showed by infrared spectroscopic analysis a broad absorption at $3.05\mu$ due to —OH, a sharp one at $3.46\mu$ due to —CH$_2$—, and a broad one near $7$–$10\mu$ due to C—F, and was confirmed to be an addition product of ethanol and the starting dimer. By elementary analysis were found: C=28.1%; F=64.3%; H=1.79%.

Calculated values for $C_8F_{12}H_6O$: C=27.8%; F=65.8%; H=1.73%.

Further by nuclear magnetic resonance absorption analysis said distillate was confirmed to be:

$$CF_3-\underset{|}{C}F-CFH-\underset{|}{C}F-\underset{\underset{CH_3}{|}}{C}H-OH$$
$$\phantom{CF_3-C}CF_3\phantom{-CFH-}CF_3$$

100 grams of the fluorinated alcohol thus obtained, 0.3 gram of hydroquinone, 83 grams of acrylic acid, 1 gram of conc. sulfuric acid and 200 cc. of carbon tetrachloride were placed in a 500-cc. flask equipped with a Soxhlet's extractor and cooler, and the mixture was heated to a reflux temperature and maintained for 10 hours. During the reaction water produced was removed from an azeotropic mixture with carbon tetrachloride by means of calcium carbonate placed in the extractor. After completion of the reaction carbon tetrachloride was distilled away and the residue to which 0.2 gram of hydroquinone was further added was distilled under reduced pressure to obtaine 84 grams of a distillate boiling at 90°–91° C./20 mm. Hg with 40 grams of unreacted acrylic acid recovered.

The distillate showed by infrared spectroscopic analysis absorptions at $5.75\mu$ due to $>$C=O and $6.15\mu$ due to —HC=CH$_2$.

Elementary analysis gave.—Found: C=33.5%; F=55.5%; H=2.2%. Calcd.: C=33.0%; F=57.0%; H=2.02% ($C_{11}F_{12}H_8O_2$).

Thus the substance was confirmed to be $$CF_3-\underset{|}{C}F-CFH-\underset{|}{C}F-\underset{\underset{CH_3}{|}}{C}H-O-\underset{||}{C}-CH=CH_2$$
$$\phantom{CF_3-C}CF_3\phantom{-CFH-C}\phantom{CH-O-}O$$

30 grams of $$CF_3-\underset{|}{C}F-CFH-\underset{|}{C}F-\underset{\underset{CH_3}{|}}{C}H-O-\underset{||}{C}-CH=CH_2$$
$$\phantom{CF_3-C}CF_3\phantom{-CFH-C}\phantom{CH-O-}O$$

obtained as above, 180 grams of deoxidated water, 14 grams of acetone and 6.5 grams of "Nonion HS–240" (trade mark for a polyoxyethylene alkyl phenol ether of Nippon Oils & Fats Co., Ltd., Japan) were placed in a 500-cc., 4-necked flask with a reflux cooler, thermometer, dropping funnel, nitrogen gas injector and agitator, and the air in the flask was replaced by nitrogen gas with thorough agitation, after which the temperature was gradually raised with slow agitation to about 50° C., at which 100 grams of a 1.5 weight percent of aqueous solution of potassium persulfate was added thereto. Agitation was further continued at 51°–57° C. for 4 hours and 30 minutes, whereby 323 grams of a polymer dispersion of a concentration of 8.7 weight percent, fluorescent in color and highly stable, was obtained.

110 grams of said polymer dispersion, 40 cc. of isobutanol, 1 gram of "Scoarol #100" (trademark for a nonionic surfactant (polyoxyethylene lauryl ether), of Kao Soap Co., Ltd., Japan), 890 grams of deionized water, 3 grams of sodium acetate, and 2.5 grams of acetic acid were mixed to constitute the first bath.

Further, 60 grams of "Zeran AP" (trademark for a water-repellent of Du Pont de Nemours & Co., U.S.A.), 10 grams of "Sumitex Resin M–3" (trademark for a synthetic resin of Sumitomo Chemical Co., Ltd., Japan), 1 gram of "Sumitex ACX" (trademark for a hardener of Sumitomo Chemical Co., Ltd., Japan), 12 grams of sodium acetate and 1,000 grams of deionized water were mixed to constitute the second bath. Cotton poplin cuttings were dipped in the first bath for 3 minutes, then lightly squeezed, predried at 80–83° C. for 7 minutes and then cured at 160° C. for 3 minutes. The cuttings so treated were soaped for 1 minute at 45°–55° C. with a 0.3 weight percent aqueous solution of a neutral detergent and 0.2 weight percent of soda ash, then thoroughly dried and dipped in the second bath, followed by drying and soaping in the similar manner, and finally thoroughly washed with water and dried. The cotton poplin so treated gave a refreshing touch, showing no noticeable decline in strength, and exhibited an excellent water-repellency and oil-repellency, showing 100 marks by AATCC spray test, as well as sustaining without infiltration drops of a 20:80 volume ratio mixture of liquid paraffin and n-heptane.

The cotton poplin treated as above exhibited exceedingly excellent resistance to washing. For instance, its water- and oil-repellency showed no noticeable change after repetition of 5 cycles of washing by a household washing machine in which a 0.5 weight percent aqueous solution of a neutral detergent was used.

EXAMPLE 4

300 grams of a mixture of 2 species of hexafluoropropylene dimers same as those employed in Example 1, 180 grams of anhydrous isopropanol, 200 grams of trifluorotrichloroethane, and 10 grams of azobisisobutyronitrile were placed in a 500-cc. autoclave, and the air in the autoclave was replaced by nitrogen gas. Thereafter the mixture was heated with violent shaking at 80° C. for 26 hours. The repeated fractional distillation of the resultant reaction mixture gave 106 grams of a distillate (A) boiling at 77°–80° C./50–52 mm. Hg and 73 grams of a distillate (B) boiling at 72°–74° C./50–51 mm. Hg.

These substances (A) and (B) above were confirmed respectively to be a fluorinated alcohol by infrared spectroscopic analysis, and further by measuring molecular weights thereof using difluorotetrachloroethane the following results were obtained.—Found: Substance (A)=358; Substance (B)=353. Calcd.: 360 ($C_9F_{12}H_8O$).

From the above finding, the above substances were confirmed respectively to be an addition products of isopropyl alcohol to the starting dimer, and further by nuclear magnetic resonance absorption analysis was confirmed that Compound (A) was $$CF_3-\underset{|}{C}F-CFH-\underset{|}{C}F-\underset{\underset{CH_3}{|}}{\overset{CH_3}{C}}-OH$$
$$\phantom{CF_3-C}CF_3\phantom{-CFH-}CF_3$$

and

Compound (B) was $$CF_3-\underset{\underset{H}{|}}{C}-CF-\underset{\underset{CH_3}{|}}{\overset{CH_3}{C}}-OH$$
$$\phantom{CF_3-}CF_3\phantom{-CF-}C_2F_5$$

100 grams of the above compound (A), $$CF_3-\underset{|}{C}F-CFH-\underset{|}{C}F-\underset{\underset{CH_3}{|}}{\overset{CH_3}{C}}-OH,$$
$$\phantom{CF_3-C}CF_3\phantom{-CFH-}CF_3$$

was esterified with acrylchloride in the same manner as Example 1, and by rectification of the resultant mixture 95 grams of a distillate boiling at 96°–97° C./20 mm. Hg was obtained. This compound was confirmed by infrared spectroscopic analysis to be a fluorinated ester having a double-bond, and further by elementary analysis were found: C=33.2%; F=54.8%; H=2.5%.

Calculated values for $C_{12}F_{12}H_{10}O_2$: C=34.8%; F=55.0%; H=2.4%.

Thus the compound was comfirmed to be an ester of acrylic acid and said alcohol.

90 grams of $$CF_3-\underset{|}{C}F-CFH-\underset{|}{C}F-\underset{\underset{CH_3}{|}}{\overset{CH_3}{C}}-O-\underset{||}{C}-CH=CH$$
$$\phantom{CF_3-C}CF_3\phantom{-CFH-}CF_3\phantom{-C-O-}O$$

thus obtained 800 grams of deoxidated water and 4 grams of $CF_3(CF_2)_7COONH_4$ were placed in a 1-liter stainless steel autoclave, and the air in the autoclave was thoroughly replaced by nitrogen gas. Thereafter system was slowly agitated at room temperature and subjected to irradiation of γ-rays emitting from 2,000-curie $Co^{60}$ source at a dose rate of $7.5 \times 10^4$ r./hr. for 1 hour. There occured no changes in the reaction temperature and pressure, maintaining 23.5° C. and 0 kg./cm.² G. Agitation continued for 40 minutes after completion of the irradiation, whereby 880 grams of a polymer dispersion having a concentration of 9.8 weight percent, opaque and milk white in color was obtained. The dispersion was so stable that no precipitate was produced after lapse of 6 months.

Woolen gabardine cuttings treated with polymer dispersion thus obtained in the same manner as Example 1 exhibited excellent water- and oil-repellency.

What is claimed is:

1. A fluorocarbon compound having the formula:

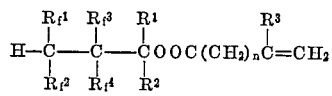

wherein $R_f^1$, $R_f^2$, $R_f^3$ and $R_f^4$ are respectively one member of the group consisting of —F, —$CF_3$, —$CF_2CF_3$,

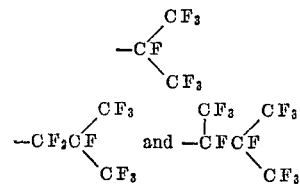

with the proviso that $R_f^1$ and $R_f^2$ are not both —F and $R_f^3$ and $R_f^4$ are not both —F; $R^1$, $R^2$ and $R^3$ are respectively one member of the group consisting of —H and —$CH_3$; and $n$ is an integer of from 0 to 10.

2. The fluorocarbon compound of claim 1 in which $n$ is an integer of zero.

3. The fluorocarbon compound of claim 1, in which both $R^1$ and $R^2$ are hydrogen and $n$ is an integer of zero.

4. A polymer having a skeletal chain containing ester units represented by the formula:

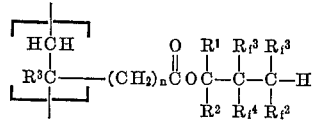

wherein $R_f^1$, $R_f^2$, $R_f^3$ and $R_f^4$ are respectively one member of the group consisting of —F, —$CF_3$, —$CF_2CF_3$,

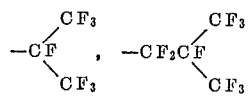

and

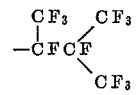

respectively, with the proviso that $R_f^1$ and $R_f^2$ are not both —F and $R_f^3$ and $R_f^4$ are not both —F; $R^1$, $R^2$ and $R^3$ are respectively one member of the group consisting of —H and —$CH_3$; and $n$ is an integer from 0 to 10.

5. An article which is coated with the polymer specified in claim 4.

References Cited

UNITED STATES PATENTS

| | | | |
|---|---|---|---|
| 3,025,279 | 3/1962 | Barr | 260—86.1 |
| 3,177,185 | 4/1965 | Hollander et al. | |
| 3,249,596 | 5/1966 | Pierce et al. | 260—86.1 |

HARRY WONG, Jr., Primary Examiner

U.S. Cl. X.R.

117—161, 140, 155, 145, 138.8, 142, 124, 148; 204—159.22; 260—486, 86.1, 63, 86.7, 86.3, 83.5, 29.6, 32.8, 33.8, 89.3